US011348725B2

(12) United States Patent
Lee et al.

(10) Patent No.: US 11,348,725 B2
(45) Date of Patent: May 31, 2022

(54) METHOD OF MANUFACTURING VISUALLY STEREOSCOPIC PRINT FILM AND VISUALLY STEREOSCOPIC PRINT FILM MANUFACTURED USING THE METHOD

(71) Applicant: UNIST, Ulsan (KR)

(72) Inventors: Ki-Suk Lee, Ulsan (KR); Hye-Jin Ok, Ulsan (KR); Myeonghwan Kang, Ulsan (KR); Daehan Jeong, Ulsan (KR)

(73) Assignee: UNIST (Ulsan National Institute of Science and Technology), Ulsan (KR)

( * ) Notice: Subject to any disclaimer, the term of this patent is extended or adjusted under 35 U.S.C. 154(b) by 111 days.

(21) Appl. No.: 16/675,073

(22) Filed: Nov. 5, 2019

(65) Prior Publication Data

US 2020/0350119 A1    Nov. 5, 2020

(30) Foreign Application Priority Data

Apr. 30, 2019    (KR) .................. 10-2019-0050366

(51) Int. Cl.
| | |
|---|---|
| *H01F 41/16* | (2006.01) |
| *H01F 1/047* | (2006.01) |
| *B42D 25/369* | (2014.01) |
| *B05D 3/00* | (2006.01) |
| *B42D 25/45* | (2014.01) |
| *B42D 25/373* | (2014.01) |
| *G02B 30/00* | (2020.01) |
| *B42D 25/387* | (2014.01) |

(52) U.S. Cl.
CPC ............. *H01F 41/16* (2013.01); *B05D 3/207* (2013.01); *B42D 25/369* (2014.10); *B42D 25/373* (2014.10); *B42D 25/45* (2014.10); *G02B 30/00* (2020.01); *H01F 1/047* (2013.01); *B42D 25/387* (2014.10)

(58) Field of Classification Search
CPC .................................................. B05D 3/207
See application file for complete search history.

(56) References Cited

U.S. PATENT DOCUMENTS

| | | | |
|---|---|---|---|
| 3,853,676 A | 12/1974 | Graves | |
| 4,438,179 A * | 3/1984 | Solo .................. | H01F 1/0027 252/62.54 |
| 5,079,058 A | 1/1992 | Tomiyama et al. | |
| 7,674,501 B2 | 3/2010 | Raksha et al. | |
| 9,617,435 B2 | 4/2017 | Krueger et al. | |
| 2002/0160194 A1 | 10/2002 | Phillips et al. | |
| 2008/0248255 A1 * | 10/2008 | Argoitia .................. | C09D 5/29 428/168 |

FOREIGN PATENT DOCUMENTS

| | | |
|---|---|---|
| JP | 2005509691 A | 4/2005 |
| JP | 2007021492 A | 2/2007 |

(Continued)

*Primary Examiner* — Ian A Rummel
(74) *Attorney, Agent, or Firm* — Dorsey & Whitney LLP

(57) ABSTRACT

Disclosed are a stereoscopic magnetic print film formed using magnetic particles and a method of manufacturing the stereoscopic magnetic print film. The method includes preparing magnetic ink including magnetic particles, forming a printing layer on a base layer using the prepared magnetic ink, and forming a stereoscopic pattern by applying a magnetic field to the printing layer.

12 Claims, 12 Drawing Sheets

(56) References Cited

FOREIGN PATENT DOCUMENTS

| | | |
|---|---|---|
| JP | 2009090624 A | 4/2009 |
| JP | 2012523470 A | 10/2012 |
| JP | 5862892 B2 | 1/2016 |
| KR | 1020150065903 | 6/2015 |
| KR | 1020160083578 | 7/2016 |
| KR | 1020160127238 | 11/2016 |
| KR | 1020170129026 | 11/2017 |

* cited by examiner

Magnetic particle 1

Magnetic particle 2

Magnetic particle 3

Magnetic particle 4

• Manufacture electromagnet of desired shape

<In the presence of core material>

<In the absence of core material>

METHOD OF MANUFACTURING VISUALLY STEREOSCOPIC PRINT FILM AND VISUALLY STEREOSCOPIC PRINT FILM MANUFACTURED USING THE METHOD

CROSS-REFERENCE TO RELATED APPLICATION(S)

This application claims the priority benefit of Korean Patent Application No. 10-2019-0050366 filed on 30 Apr. 2019 in the Korean Intellectual Property Office, the disclosure of which is incorporated herein by reference for all purposes.

BACKGROUND

I. Field

One or more example embodiments relate to a print film in which a three-dimensional (3D) shape is visually embodied, and more particularly, to a print film having an optical effect by coating a substrate with ink or paint.

II. Description of Related Art

There is ongoing research on an optical illusion that creates a visual effect in technical fields of design and security. The optical illusion may be embodied by coating a substrate or a base layer with ink or paint and controlling reflectivity. For the optical illusion, a magnetic material may be used as particles, and prepared as magnetic paint to be oriented based on a magnetic field to be applied.

As an example of the research, U.S. Pat. No. 3,853,676 by Graves et al. discloses a film containing a film-forming material and oriented in curved configurations to be disposed at locations in close proximity to the film, such that the film is differently viewed based on a location from which a person views the film.

As another example, U.S. Pat. No. 5,079,058 by Tomiyama et al. discloses a laminated sheet including a multilayer structure prepared by successively laminating a release sheet layer, a pressure-sensitive adhesive layer, a base sheet layer, and a patterned film layer, and a process of coating a fluid coating composition containing a powdery magnetic material on one side of the base sheet layer and acting a magnetic force on the powder magnetic material contained in the fluid film to form a pattern of the patterned film layer.

However, there has been a limitation in generating an elaborately designed fine stereoscopic effect. In a current environment where more complex and various designs are introduced, there is an industrial desire for technology for preparing a coating layer that realizes a more aesthetic sense and more diversified three-dimensional (3D) stereoscopic effect.

SUMMARY

An aspect provides a stereoscopic print film manufactured by controlling magnetic particles more effectively.

Another aspect also provides a method of controlling a shape of magnetic particles and more precisely controlling an orientation of light to be reflected.

Still another aspect also provides a simple and easy method of embodying a complex stereoscopic effect of a print film of a magnetic material by controlling a magnetic field in various ways.

However, aspects or tasks to be achieved by the present disclosure are not limited to the aspects described in the foregoing, and thus other aspects or tasks not described above may also be clearly understood by those skilled in the art from the following description.

According to an example embodiment, there is provided a method of manufacturing a stereoscopic magnetic print film, the method including preparing magnetic ink including magnetic particles, forming a printing layer on a base layer using the prepared magnetic ink, and forming a stereoscopic pattern on the printing layer by applying a magnetic field to the printing layer.

The preparing of the magnetic ink may include dissolving, in a solvent for ink, magnetic particle powder with a particle size of 5 micrometers (μm) or less.

The magnetic particles may include at least one selected from a group consisting of a magnetic ceramic material including an iron oxide-based material and a M-Fe—O system in which M is all ions capable of substituting Fe ions, a magnetic metal material including Al-, Co-, Ni-, and Fe-based materials, and a mixture of the magnetic ceramic material and a nonmagnetic ceramic material.

The solvent for ink may include at least one selected from a group consisting of flexo ink, gravure ink, offset ink, screen ink, and ultraviolet (UV) ink.

Before the dissolving of the magnetic particle powder in the solvent for ink, the method may further include coating the magnetic particle powder.

The coating of the magnetic particle powder may include mixing the magnetic particles with a solution including at least one selected from a group consisting of a polymer material, $SiO_2$, $Al_2O_3$, $TiO_2$, and Prussian blue ($Fe_7(CN)_{18}$), and drying the mixture of the magnetic particles and the solution.

The forming of the printing layer may include forming a plurality of regions with different thicknesses in the printing layer.

The forming of the stereoscopic pattern may include adjusting an arrangement of the magnetic particles by adjusting a magnetic field to be applied to the printing layer using a magnetic plate using at least one of an electromagnet or a permanent magnet.

The forming of the stereoscopic pattern may include adjusting a (direction and/or strength of) magnetic field to be applied to each region by applying the magnetic field while varying a polarity arrangement of a magnet.

The forming of the stereoscopic pattern may include adjusting a (direction and/or strength of) magnetic field to be applied to each region using a metal material of a geometric shape and an electromagnet.

The forming of the stereoscopic pattern may include adjusting a magnetic field to be applied to each region by attaching a metal material to a surface of a portion of regions of a magnet.

The forming of the stereoscopic pattern may include adjusting strength of a magnetic field to be applied to each region by adjusting a distance between a magnetic field providing element and the printing layer.

The forming of the stereoscopic pattern may include adjusting strength of a magnetic field to be applied to each region by using a magnetic plate including a magnetic domain that generates an external magnetic field of different patterns in different directions formed using a permanent magnet.

Before the forming of the stereoscopic pattern, the method may further include etching at least a portion of a magnetic field providing element. Here, to completely remove the magnetic field providing element or prevent the magnetic field providing element from being remained in any portion of regions, chemical or physical etching may be performed, or a portion of a thickness of the printing layer may be scraped out.

According to another example embodiment, there is provided a stereoscopic magnetic print film including a base layer, and a magnetic printing layer formed on the base layer. The magnetic printing layer may be visually stereoscopic with magnetic particles being arranged therein.

The magnetic printing layer may provide a stereoscopic view that varies based on a location from which the magnetic printing layer is viewed.

The magnetic printing layer may include a first region including magnetic particles oriented in a first direction, and a second region including magnetic particles oriented in a second direction different from the first direction. The magnetic particles in the first region and the second region may have a same composition.

The magnetic particles may include at least one selected from a group consisting of a magnetic ceramic material including an iron oxide-based material and a M-Fe—O system in which M is all ions capable of substituting Fe ions, a magnetic metal material including Al-, Co-, Ni-, and Fe-based materials, and a mixture of the magnetic ceramic material and a nonmagnetic ceramic material. In addition, a solvent for ink may include at least one selected from a group consisting of flexo ink, gravure ink, offset ink, screen ink, and UV ink.

A size of each of the magnetic particles may be 5 μm or less.

A surface of the magnetic particles may have a coating layer including at least one selected from a group consisting of a polymer material, $SiO_2$, $Al_2O_3$, $TiO_2$, and Prussian blue ($Fe_7(CN)_{18}$).

The stereoscopic magnetic print film may be applicable for anti-forgery and security, and as an exterior material of various products requiring an aesthetic value.

The exterior material including the stereoscopic magnetic print film may include a panel, and a stereoscopic magnetic printing layer having a stereoscopic effect with magnetic particles being arranged on the panel to allow a viewer to view the exterior material differently based on a direction from which the exterior material is viewed.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
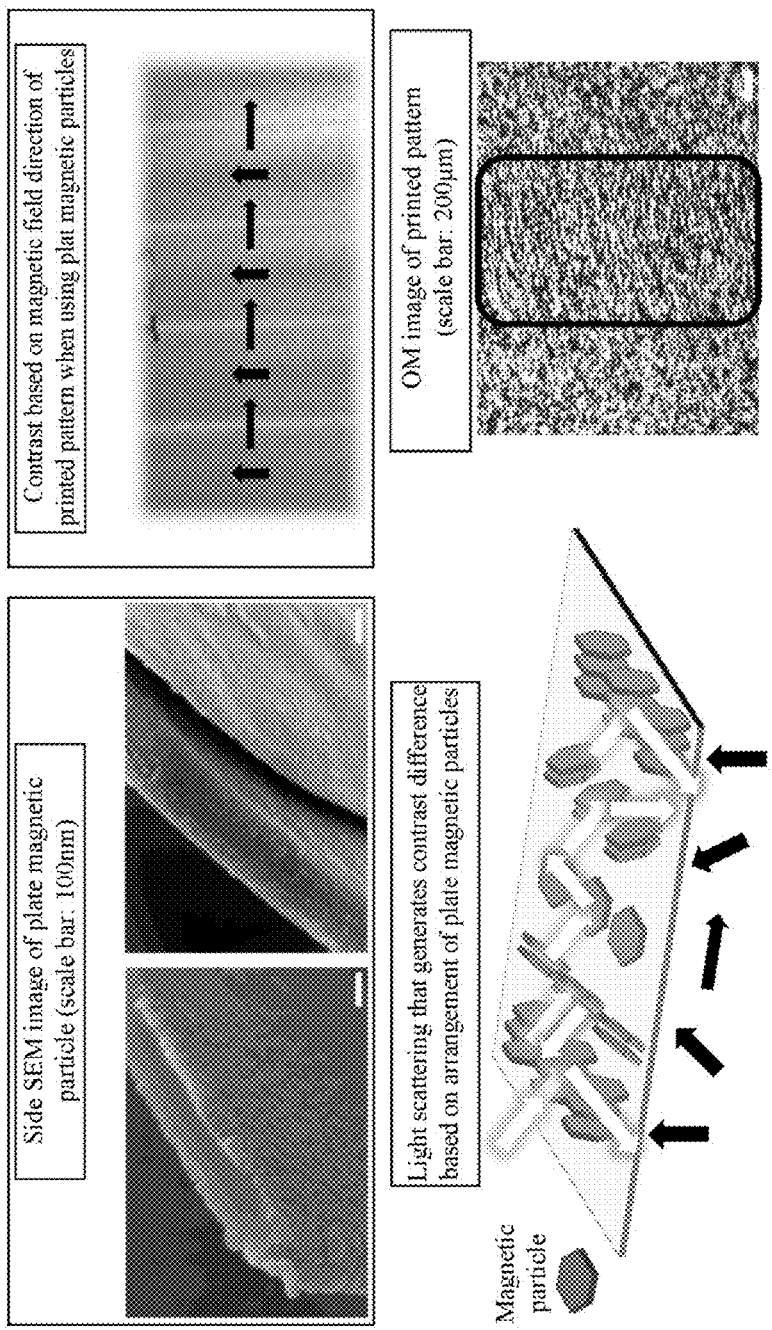
FIG. 1 illustrates scanning electron microscope (SEM) images of a magnetic print film formed using plate-type magnetic particles among various types of magnetic particles to observe a shape of such magnetic particles, and optical microscope (OM) images of the magnetic print film, and also illustrates a scattering principle and contrasts or shades in an actually embodied magnetic print film according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

According to the example embodiments, there are provided a method of embodying various stereoscopic effects using magnetic particles, and a magnetic print film manufactured by using the method.

The magnetic particles may be of various types, for example, spherical-type magnetic particles, plate-type magnetic particles, and wire-type magnetic particles.

FIG. 1 illustrates scanning electron microscope (SEM) images of a magnetic print film formed using plate-type magnetic particles among various types of magnetic particles to observe a shape of such magnetic particles, and optical microscope (OM) images of the magnetic print film, and also illustrates a scattering principle and contrasts or shades in an actually embodied magnetic print film according to an example embodiment.

Figure 2:
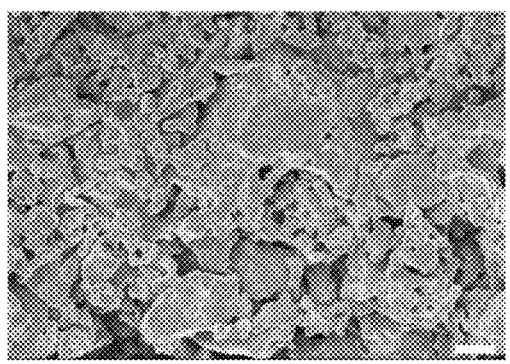
FIG. 2 illustrates SEM images of shapes of magnetic particles used to prepare magnetic ink, for example, spherical magnetic particles 1 and 2 and magnetic particles 3 and 4 according to an example embodiment.
Figure 2:
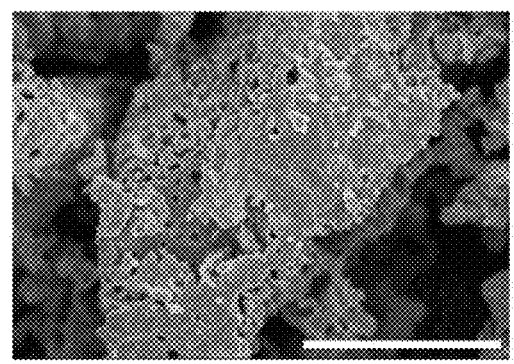
Figure 2:
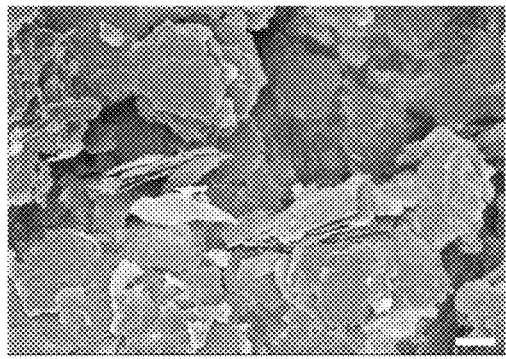
Figure 2:
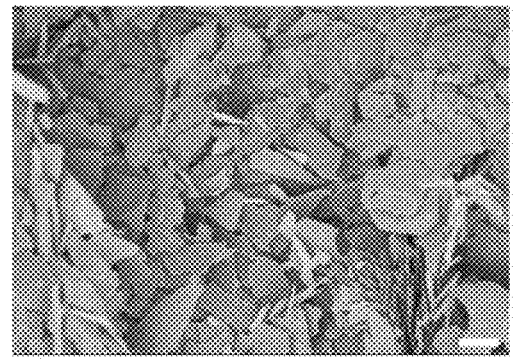

FIG. 2 illustrates SEM images to observe shapes of magnetic particles used to prepare magnetic ink, for example, spherical magnetic particles 1 and 2 and magnetic particles 3 and 4 according to an example embodiment.

Hereinafter, a method of manufacturing a magnetic print film, and a method of manufacturing the magnetic print film by using the method will be described in detail with reference to FIGS. 1 and 2.

According to an example embodiment, a method of manufacturing a stereoscopic magnetic print film includes preparing magnetic ink including magnetic particles, forming a printing layer on a base layer using the prepared magnetic ink, and forming a stereoscopic pattern by applying a magnetic field to the printing layer.

The magnetic particles are not limited in their shape, but may be of plate type for more effective stereoscopic representation. When the magnetic particles are formed with plate-type particles, a manufacturing process may be readily performed. In addition, when the plate-type magnetic particles are arranged in a direction, they may have a reflection pattern in the direction, compared to spherical-type particles, needle-shaped particles, or amorphous particles.

The preparing of the magnetic ink may include dissolving, in a solvent for ink, magnetic particle powder having a particle size of 5 micrometers ($\mu$m) or less.

The magnetic particles are not limited in their shape, but may have a plate shape for more effective stereoscopic representation.

The magnetic particles may include at least one selected from a group consisting of a magnetic ceramic material including iron oxide-based material and a M-Fe—O system, a magnetic metal material including a Al-, Co-, Ni-, or Fe-based material, and a mixture of the magnetic ceramic material and a nonmagnetic ceramic material.

In detail, the magnetic particles may include at least one selected from a group consisting of the magnetic ceramic material (e.g., an iron oxide-based material including various ions and a M-Fe—O system in which M includes all ions that may substitute Fe ions), the magnetic metal material (e.g., which may include mixed materials of Al, Co, Ni, and Fe based materials having a high magnetic response, and be prepared in a form of alloy by substituting different ions), and the mixture of the magnetic ceramic material and the nonmagnetic ceramic material.

The magnetic particles may be various in shape, for example, spherical, plate-shaped, and wire-shaped particles.

The solvent for ink may include a volatile solvent, and include at least one selected from a group consisting of flexo ink, gravure ink, offset ink, screen ink, and ultraviolet (UV) ink.

The magnetic particles may be prepared in a form of powder to be dissolved in the solvent for ink.

The method may further include coating the magnetic particle powder before dissolving the magnetic particle powder in the solvent for ink.

The surface of the magnetic particles may be coated before being dissolved.

Here, a material to be coated may include a ceramic material, silica, a polymer material, or metal salts. The polymer material may include, for example, poly(st-co-4vp), N-(2-hydroxypropyl)methacrylamide, or both poly(st-co-4vp) and N-(2-hydroxypropyl)methacrylamide.

For example, by coating the magnetic particle powder, it is possible to change a color of the magnetic particles, allow the magnetic particles to be polished or glossy, or adjust a wavelength (color) of reflected light. Thus, it is possible to provide a color suitable for a product to which the magnetic particles are applied, or control a mat or glossy characteristic.

Figure 3:
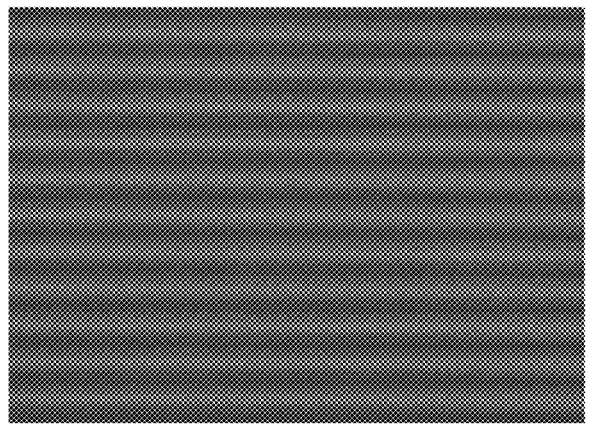
FIG. 3 illustrates an image of a stereoscopic effect exhibited from a surface of a magnetic print film of a metal particle (Ni—Cr—Fe based alloy)
Figure 4:
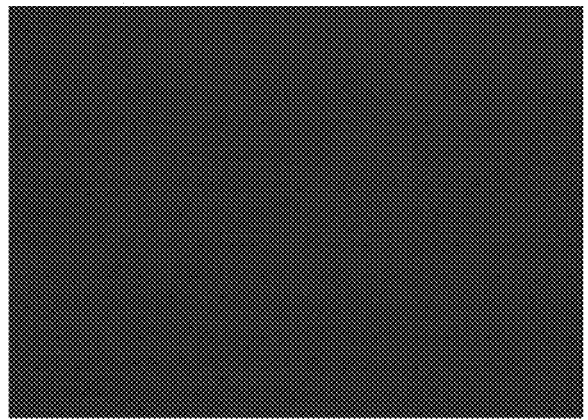
FIG. 4 illustrates an image of a stereoscopic effect exhibited from a surface of a magnetic print film of a ceramic particle (strontium oxide-based material) under the same condition.
Figure 5:
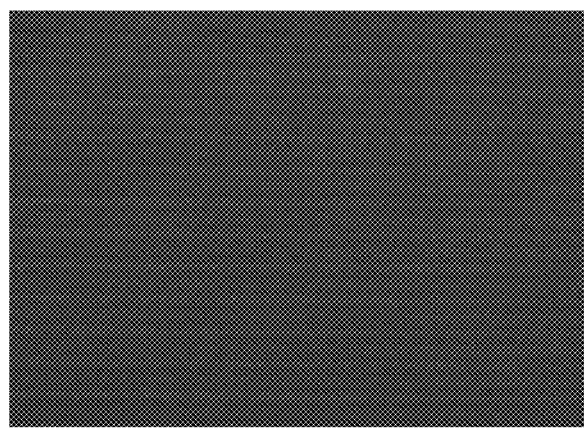
FIG. 5 illustrates an image of a stereoscopic effect exhibited from a surface of a magnetic print film with a coating layer (composite material of aluminum oxide and iron oxide) formed on a surface of a ceramic particle under the same condition.

FIG. 3 illustrates an image to observe a stereoscopic effect exhibited from a surface of a magnetic print film of a metal particle (Ni—Cr—Fe based alloy). FIG. 4 illustrates an image to observe a stereoscopic effect exhibited from a surface of a magnetic print film of a ceramic particle (strontium oxide-based material) under the same condition. FIG. 5 illustrates an image to observe a stereoscopic effect exhibited from a surface of a magnetic print film with a coating layer (composite material of aluminum oxide and iron oxide) formed on a surface of a ceramic particle under the same condition.

A surface texture and color may vary based on which material is selected for magnetic particles as described above with reference to FIGS. 3 through 5, and these may be one of elements that adjust a three-dimensional (3D) stereoscopic effect.

According to an example embodiment, the coating of the magnetic particle powder may include mixing the magnetic particles with a solution including at least one selected from a group consisting of a polymer material, $SiO_2$, $Al_2O_3$, $TiO_2$, and Prussian blue($Fe_7(CN)_{18}$), and drying the mixture. For example, the polymer material may include poly(st-co-4vp), N-(2-hydroxypropyl)methacrylamide, or both poly(st-co-4vp) and N-(2-hydroxypropyl)methacrylamide. Here, when the coating layer is formed with $SiO_2$, it is possible to adjust a glossy property. In contrast, when the coating layer is formed with $Al_2O_3$, it is possible to adjust a change of color in addition to the glossy property.

The forming of the printing layer may include forming a plurality of regions having different thickness in the printing layer.

A density of the magnetic particles may differ based on a thickness of the printing layer. For example, a certain region may be formed to have no density of magnetic particles or have a low density of magnetic particles, and another region may be formed to have a high density of magnetic particles.

To form the printing layer with different thicknesses, the number of applying the magnetic ink to a certain region or the number of coatings may be adjusted, and then the ink in the region may be drawn off from the region or scraped to be added to another region. Alternatively, after the ink is dried, the printing layer of the region may be etched as needed.

For example, by preparing various forms of metallic bumps on a surface of a substrate or a magnet, it is possible to control various magnetic field distributions based on a form of the metallic bumps.

Figure 6:
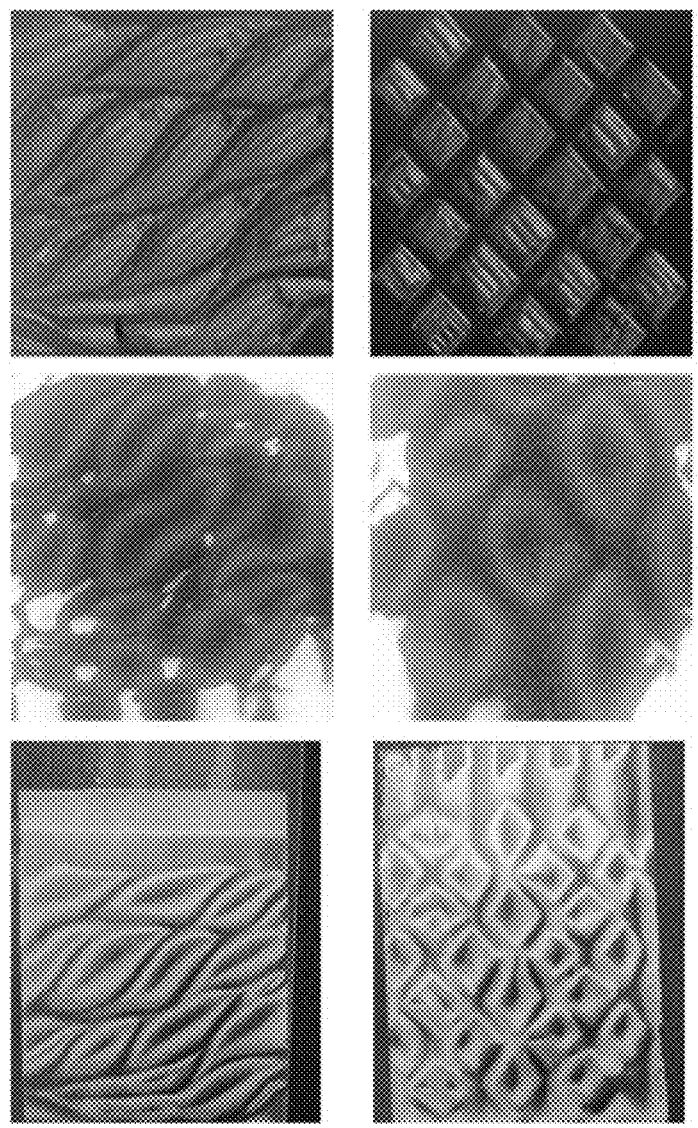
FIGS. 6 and 7 illustrate images of various stereoscopic effects exhibited from examples of magnetic print film manufactured by varying a magnetic field through direct etching of a magnetic field providing element.
Figure 7:
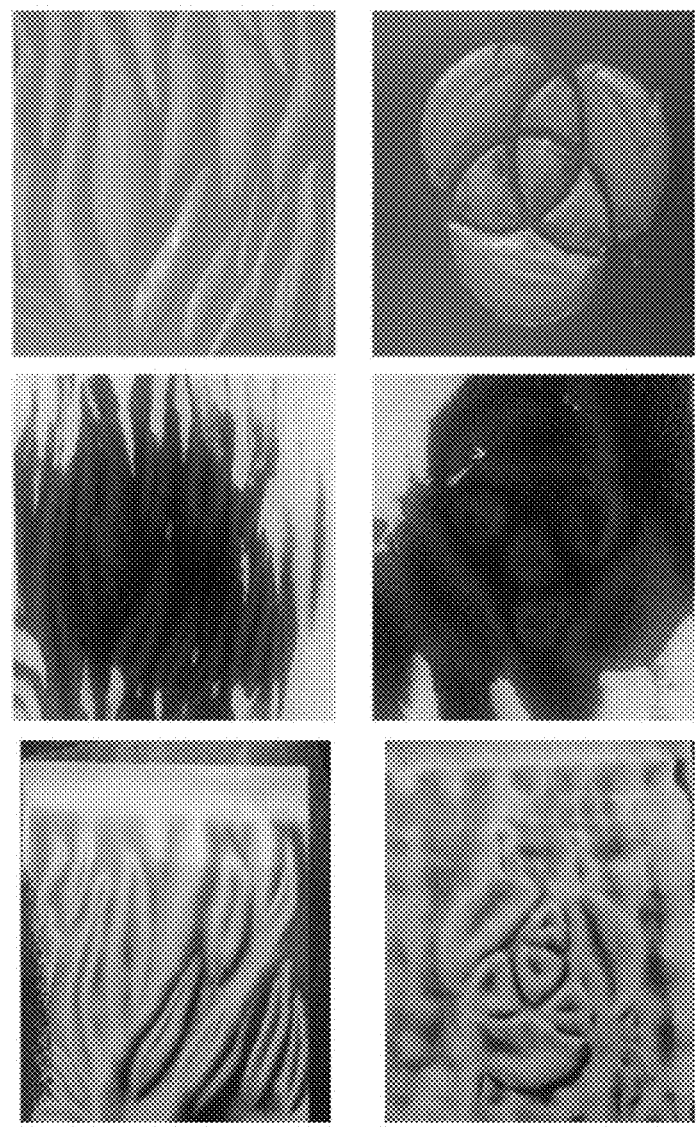

FIGS. 6 and 7 illustrate images of various stereoscopic effects exhibited from examples of magnetic print film manufactured by varying a magnetic field through direct etching of a magnetic field providing element.

Referring to FIGS. 6 and 7, various visual forms of stereoscopic depth are observed from a flat film by forming bumps on a magnetic field providing element or etching the bumps thereon.

According to an example embodiment, the forming of the stereoscopic pattern may include adjusting strength of a magnetic field to be applied to each region using a magnetic plate using at least one of an electromagnet or a permanent magnet, and controlling an arrangement of magnetic particles. The electromagnet, the permanent magnet, and the magnet plate may change a magnetic field of a magnet structure such that a desired magnetic field is on a substrate or a base layer.

The magnetic plate may be designed to include a plurality of magnetic domains that generates various patterns of external magnetic field in different directions by applying a magnetic field overcoming a coercive force to a local region using the permanent magnet.

The forming of the stereoscopic pattern may include adjusting strength of a magnetic field to be applied to each region of the printing layer by applying the magnetic field while varying a polarity arrangement of a magnet.

For example, the strength of the magnetic field may be adjusted by adjusting an arrangement of a spatial position and/or a polarity of a permanent magnet.

Figure 8:
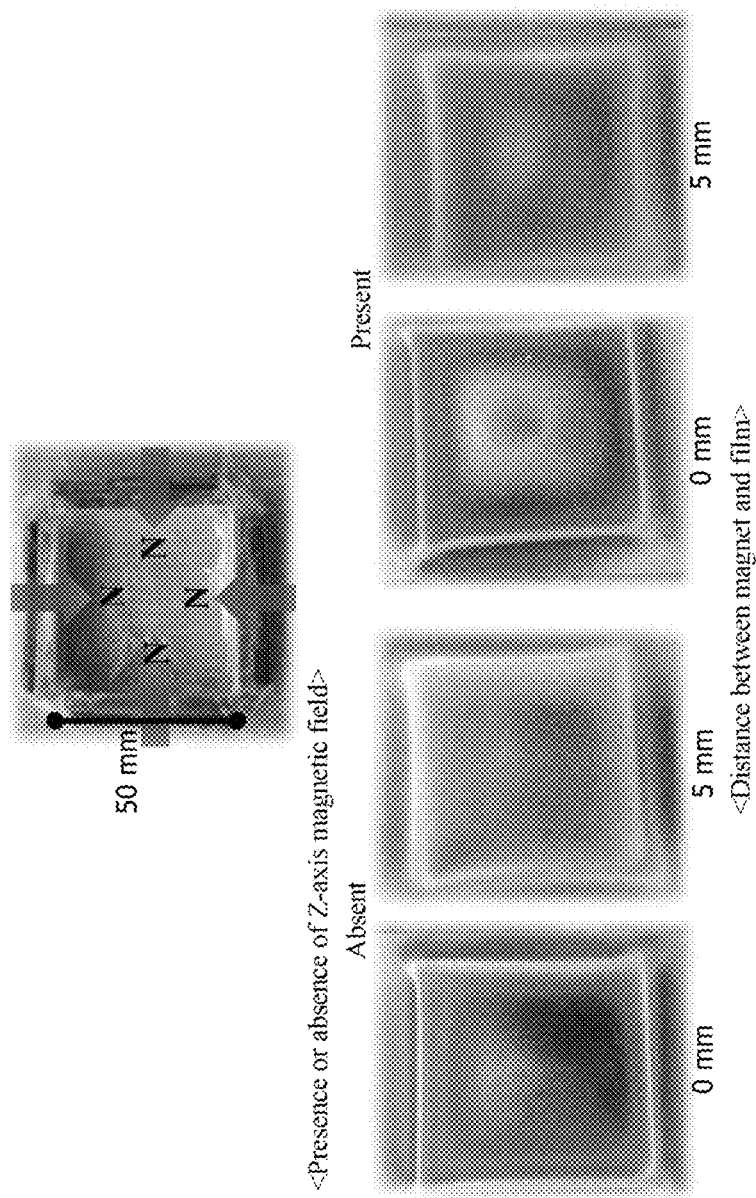
FIG. 8 illustrates images of a stereoscopic effect exhibited from a surface of a magnetic print film based on an arrangement of a magnet and a distance between the magnet and a substrate.

FIG. 8 illustrates images of a stereoscopic effect exhibited from a surface of a magnetic print film based on an arrangement of a magnet and a distance between the magnet and a substrate.

Figure 9:
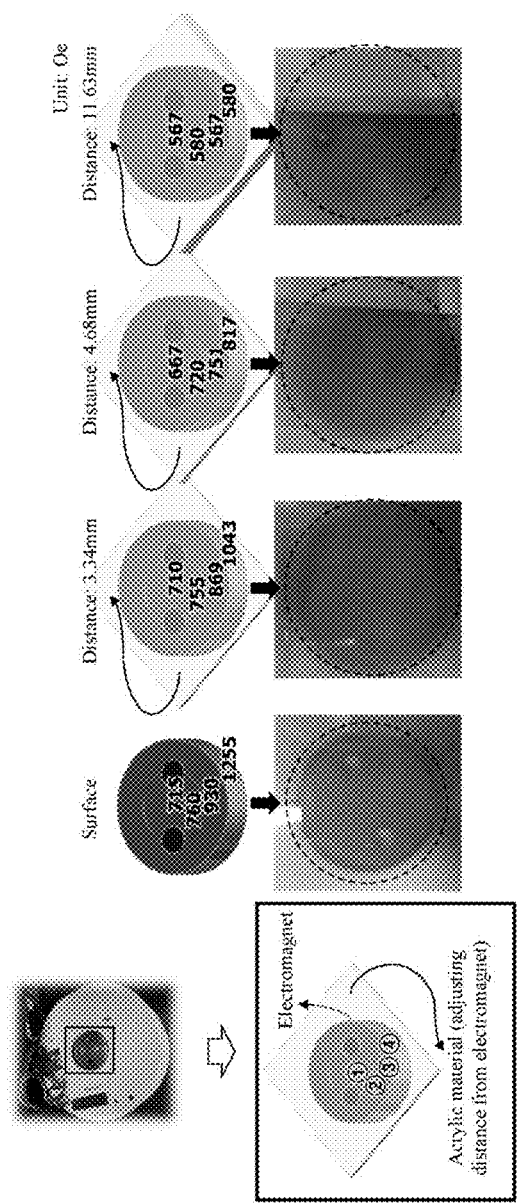
FIG. 9 illustrates images of a stereoscopic effect exhibited from a surface of a magnetic print film when a distance between a magnet and a substrate is adjusted and strength of a magnetic field strength to be applied to each region is adjusted.

FIG. 9 illustrates images of a stereoscopic effect exhibited from a surface of a magnetic print film when a distance between a magnet and a substrate is adjusted and strength of a magnetic field to be applied to each region is adjusted.

Various types of magnet may be used as illustrated in FIGS. 8 and 9, and a magnetic field to be applied may be adjusted in various ways, for example, by changing an arrangement of magnetic poles, and a relative direction and/or distance from a substrate or a base layer.

According to an example embodiment, the forming of the stereoscopic pattern may include adjusting strength of a magnetic field to be applied to each region using an electromagnet formed to surround a core material.

Figure 10:
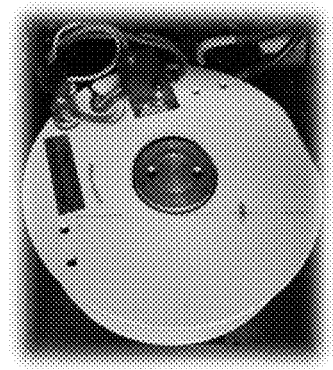
FIG. 10 illustrates images of a stereoscopic effect exhibited from a surface of a magnetic print film when strength of a magnetic field to be applied to each region is adjusted using an electromagnet formed on an outer surface of a core material of various shapes.
Figure 10:
Figure 10:
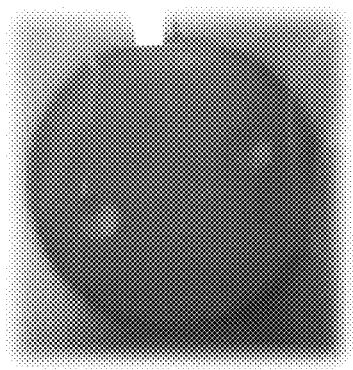
Figure 10:
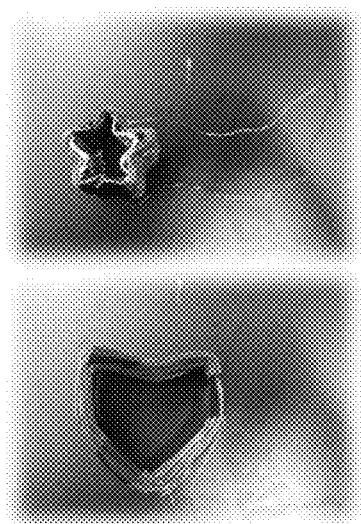
Figure 10:
Figure 10:
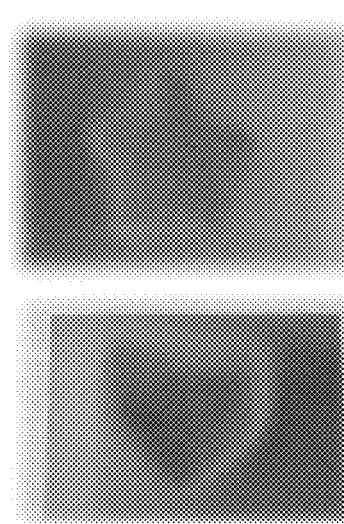
Figure 10:

FIG. 10 illustrates images of a stereoscopic effect exhibited from a surface of a magnetic print film when strength of a magnetic field to be applied to each region is adjusted using an electromagnet formed on an outer surface of a core material of various shapes.

As illustrated, a 3D stereoscopic effect may be verified although an outer shape of a core material is totally reflected, or directly transferred, onto a substrate to be flat. Here, a degree of visibility or sharpness of a pattern may be determined based on a shape of an electromagnet. When using the electromagnet including the core material, a sufficiently high degree of stereoscopic effect may be achieved although a magnetic field having a relatively low degree of strength is used.

According to an example embodiment, the forming of the stereoscopic pattern may include attaching a metal material to a surface of at least one region of a magnet and adjusting strength of a magnetic field to be applied to each region.

Figure 11:
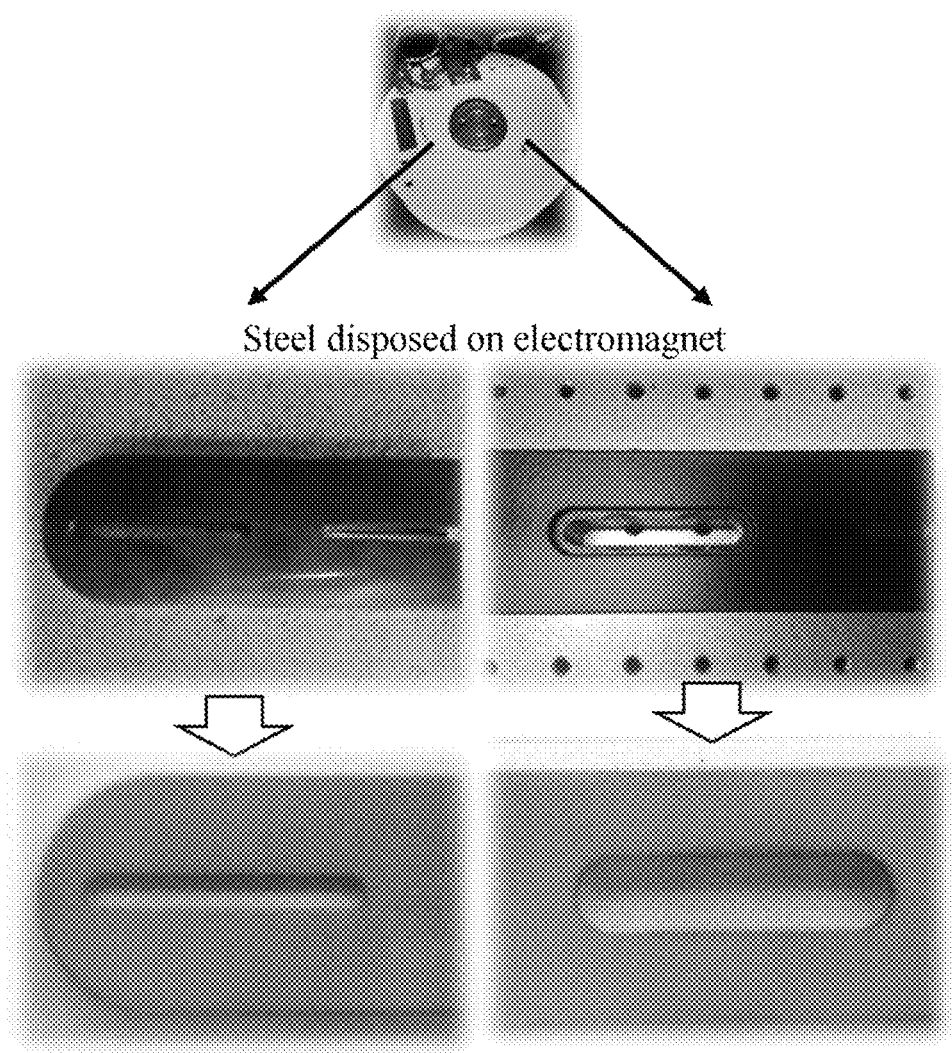
FIG. 11 illustrates images of a stereoscopic effect exhibited from a surface of a magnetic print film when strength of a magnetic field to be applied to each region is adjusted using an electromagnet and a metal material having various geometric shapes.

FIG. 11 illustrates images of a stereoscopic effect exhibited from a surface of a magnetic print film when strength of a magnetic field to be applied to each region is adjusted using an electromagnet and a metal material having various geometric shapes.

By attaching a metal material onto a surface of an electromagnet and applying thereto a magnetic field, an outer shape of the metal material may be projected onto a substrate or a base layer, and thus a visually stereoscopic effect may be obtained therefrom. Thus, it is possible to obtain an intended stereoscopic effect from a surface of a print film using a simple method of attaching a designed metal material onto a surface of an electromagnet.

According to an example embodiment, the forming of the stereoscopic pattern may include adjusting strength of a magnetic field to be applied to each region by adjusting a distance between a magnet and the printing layer.

Figure 12:
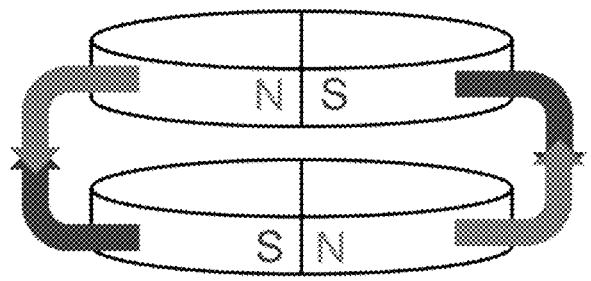
FIG. 12 illustrates a method of controlling generation of an external magnetic field using a magnetic switch to switch on or off a magnetic field by controlling an internal magnetic field of a magnet.
Figure 12:
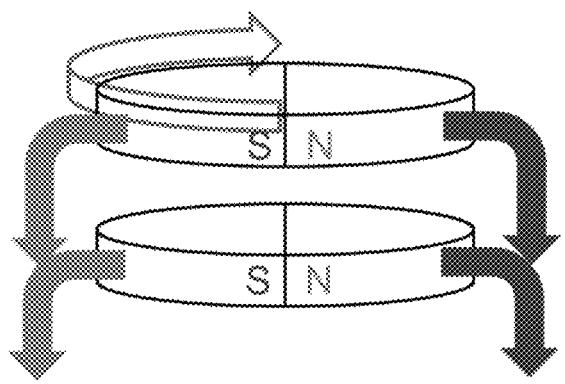

FIG. 12 illustrates a method of controlling generation of an external magnetic field using a magnetic switch to switch on or off a magnetic field by controlling an internal magnetic field of a magnet.

According to an example embodiment, a magnetic print film may be formed by controlling the generation of a magnetic field for each region through magnetic switching. For example, by complementarily arranging polarities of two magnets and connecting a magnet switch thereto, it is possible to prevent a magnetic field from being radiated externally when the switch is turned off. It is also possible to physically design poles of the two magnets having the same polarity to be oriented in the same direction when the switch is turned on. Thus, it is possible to control the generation of a magnetic field to be applied to each region and adjust strength of the magnetic field in various ways.

According to an example embodiment, the forming of the stereoscopic pattern may include adjusting strength of a magnetic field to be applied to each region using a magnetic plate including a plurality of magnetic domains formed using a permanent magnet.

Figure 13:
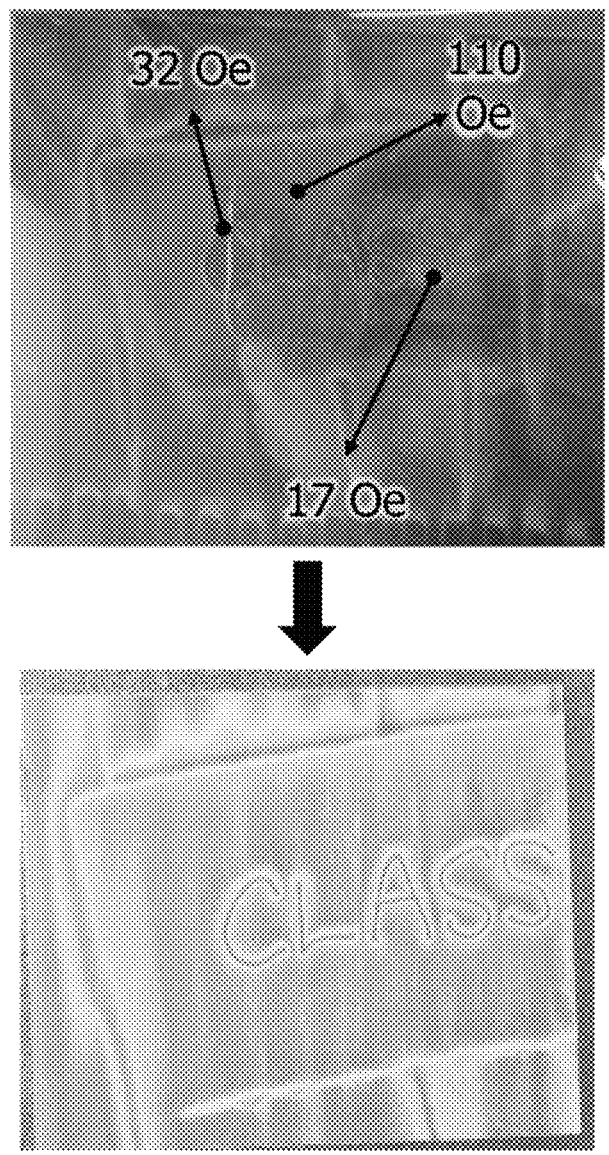
FIG. 13 illustrates images of a stereoscopic effect exhibited from a surface of a magnetic print film when a magnetic plate having a magnetic domain formed by applying, to a local region, a magnetic field capable of overcoming a coercive force.

FIG. 13 illustrates images of a stereoscopic effect exhibited from a surface of a magnetic print film when a magnetic plate having a magnetic domain formed by applying, to a local region, a magnetic field capable of overcoming a coercive force.

Using such a magnetic plate having a magnetic domain formed by applying a magnetic field that surpasses a coercive force to a local region as illustrated in FIG. 13, it is possible to form a stereoscopic protrusion or recess, or form a finely patterned print film having letters thereon.

According to an example embodiment, the method described herein may further include etching at least one region of a magnetic field providing element before the forming of the stereoscopic pattern.

The etching may include chemically or physically etching the at least one region of the magnetic field providing element. The etching may also include partially or fully etching a thickness of the magnetic field providing element.

According to another example embodiment, there is provided a stereoscopic magnetic print film which is manufactured using the method described above.

The magnetic print film manufactured to be visually stereoscopic may include a base layer (or a substrate described herein interchangeably) and a magnetic printing layer formed on the base layer. The magnetic printing layer may have magnetic particles arranged therein, and thus have a visually stereoscopic effect.

The magnetic printing layer may have the stereoscopic effect that allows a viewer to view differently depending on a location from which it is viewed.

The magnetic printing layer may include a first region including the magnetic particles oriented in a first direction, a second region including the magnetic particles oriented in a second direction different to the first direction. The magnetic particles in the first region and the second region may have a same composition.

Herein, the magnetic particles may be of various sizes. For example, when a size of a magnetic particle is less than or equal to 5 micrometers (μm), a quality, for example, a stereoscopic effect, of a printing result may be improved.

A coating layer including at least one selected from a group consisting of a polymer material, $SiO_2$, $Al_2O_3$, $TiO_2$, and Prussian blue ($Fe_7(CN)_{18}$) may be formed on a surface of the magnetic particles.

The magnetic print film may be used for the purposes of anti-forgery and security, and as an exterior material for various products requiring an aesthetic value.

The magnetic print film may also be used as an anti-forgery film to be used for various products including, for example, physical currencies, that are required not to be forged. In addition, the magnetic print film may also be used for security products because a visual effect including, for example, a stereoscopic pattern or shape, of the magnetic print film is not readily manufactured or obtained.

The exterior material may include a panel, and a stereoscopic magnetic printing layer that is formed with magnetic particles arranged on the panel and has a stereoscopic effect varying depending on a location from viewed.

The magnetic printing layer may be applied to another exterior material for which various forms of design are needed, for example, various coating layers including an outer panel for vehicle.

According to an example embodiment, there is provided a magnetic print film that has a stereoscopic effect by controlling magnetic particles more effectively compared to an existing method.

According to an example embodiment, it is possible to more finely control an orientation of light to be reflected by controlling a form and an orientation of magnetic particles.

According to an example embodiment, by simply varying magnetic field strength while controlling an arrangement of magnetic particles, it is possible to readily embody different arrangements of magnetic particles for each region.

According to an example embodiment, it is possible to obtain a 3D stereoscopic effect to allow a viewer to view a target differently based on a direction from which the target is viewed. It is also possible to control a sense of depth and a sense of color of the 3D stereoscopic effect, and is thus possible to readily apply the method described herein to various design products or security products.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of manufacturing a stereoscopic magnetic print film, the method comprising:
   preparing magnetic ink including magnetic particles;
   forming a printing layer on a base layer using the prepared magnetic ink;
   etching at least a portion of a magnetic field providing element; and
   forming, subsequent to the etching, a stereoscopic pattern on the printing layer by:
   applying, with the magnetic field providing element, a first magnetic field to a first region of the printing layer to orientate the magnetic particles in the first region in a first direction, and applying, with the magnetic field providing element, a second magnetic field to a second region of the printing layer to orientate the magnetic particles in the second region in a second direction that is different from the first direction.

2. The method of claim 1, wherein the preparing of the magnetic ink comprises:

dissolving, in a solvent for ink, magnetic particle powder with a particle size of 5 micrometers (µm) or less.

3. The method of claim 2, wherein the magnetic particles include at least one selected from a group consisting of: a magnetic ceramic material including an iron oxide-based material and a M-Fe—O system in which M is all ions capable of substituting Fe ions; a magnetic metal material including Al-, Co-, Ni-, and Fe-based materials; and a mixture of the magnetic ceramic material and a nonmagnetic ceramic material, and the solvent for ink includes at least one selected from a group consisting of: flexo ink, gravure ink, offset ink, screen ink, and ultraviolet (UV) ink.

4. The method of claim 2, before the dissolving of the magnetic particle powder in the solvent for ink, further comprising: coating the magnetic particle powder.

5. The method of claim 4, wherein the coating of the magnetic particle powder comprises: mixing the magnetic particles with a solution including at least one selected from a group consisting of a polymer material, SiO2, Al2O3, TiO2, and Prussian blue (Fe7(CN)18), and drying the mixture of the magnetic particles and the solution.

6. The method of claim 1, wherein the forming of the printing layer comprises: forming a plurality of regions with different thicknesses in the printing layer.

7. The method of claim 1, wherein the forming of the stereoscopic pattern comprises: adjusting an arrangement of the magnetic particles by adjusting a magnetic field to be applied to the printing layer using a magnetic plate using at least one of an electromagnet or a permanent magnet.

8. The method of claim 1, wherein the forming of the stereoscopic pattern comprises: adjusting a magnetic field to be applied to each region by applying the magnetic field while varying a polarity arrangement of a magnet.

9. The method of claim 1, wherein the forming of the stereoscopic pattern comprises: adjusting a magnetic field to be applied to each region using a metal material of a geometric shape and an electromagnet.

10. The method of claim 1, wherein the forming of the stereoscopic pattern comprises: adjusting a magnetic field to be applied to each region by attaching a metal material to a surface of a portion of regions of a magnet.

11. The method of claim 1, wherein the forming of the stereoscopic pattern comprises: adjusting strength of a magnetic field to be applied to each region by adjusting a distance between the magnetic field providing element and the printing layer.

12. The method of claim 1, wherein the forming of the stereoscopic pattern comprises: adjusting strength of a magnetic field to be applied to each region by using a magnetic plate including a magnetic domain that generates an external magnetic field of different patterns in different directions formed using a permanent magnet.

* * * * *